No. 706,973. Patented Aug. 12, 1902.
G. LUND.
GAS BURNER.
(Application filed Oct. 19, 1901.)
(No Model.)
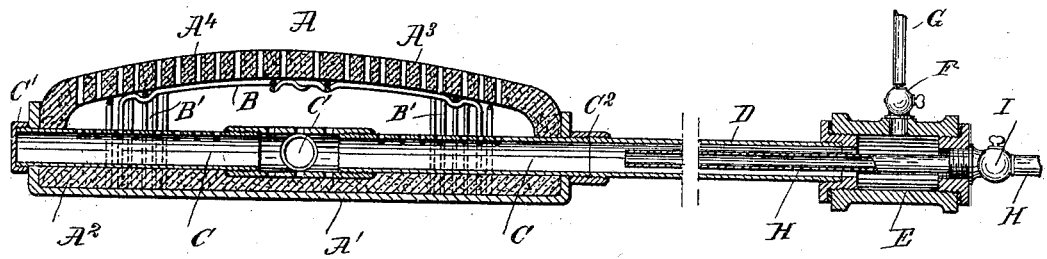
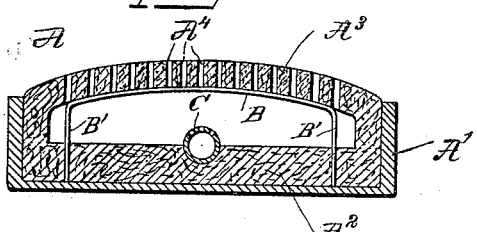
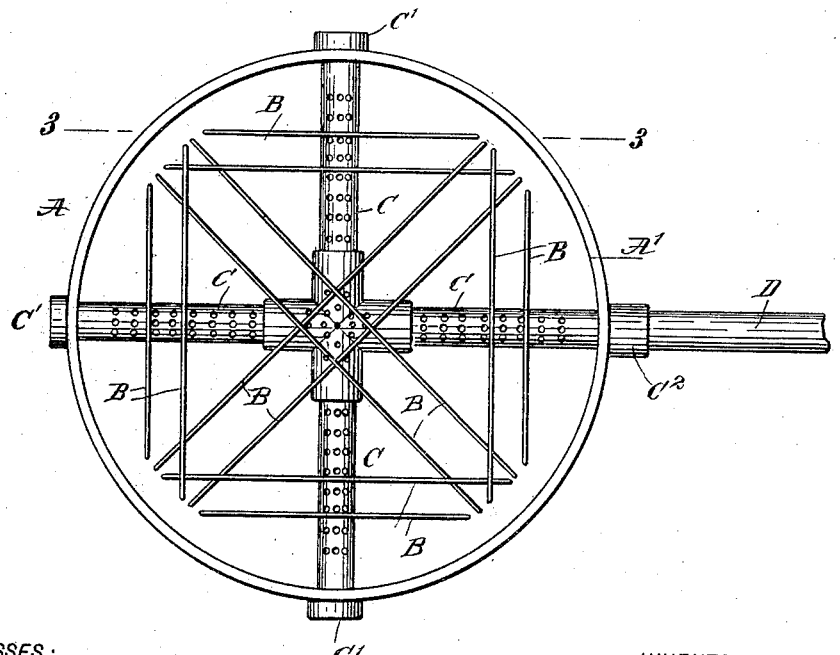
WITNESSES:
INVENTOR
George Lund
BY
ATTORNEYS

UNITED STATES PATENT OFFICE.

GEORGE LUND, OF VICTORIA, CANADA.

GAS-BURNER.

SPECIFICATION forming part of Letters Patent No. 706,973, dated August 12, 1902.

Application filed October 19, 1901. Serial No. 79,240. (No model.)

*To all whom it may concern:*

Be it known that I, GEORGE LUND, a subject of the King of Great Britain, and a resident of Victoria, in the Province of British Columbia, in the Dominion of Canada, have invented a new and Improved Gas-Burner, of which the following is a full, clear, and exact description.

The object of the invention is to provide a new and improved gas-burner which is simple and durable in construction, designed for use in boilers to heat water and generate steam, and also adapted for heating various other devices and articles, the arrangement being such that the gas is utilized to the fullest advantage and very economically.

The invention consists of novel features and parts and combination of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a sectional side elevation of the improvement. Fig. 2 is a plan view of the burner-casing with part removed, and Fig. 3 is a sectional side elevation of the same on the line 3 3 of Fig. 2.

The burner-casing A consists, essentially, of a pan A′, preferably made of metal and provided at its inside with a lining $A^2$, of fire-clay or other refractory material, and this lining is integral with a roof or dome $A^3$, likewise made of a refractory material and formed with holes $A^4$ for the passage of the mixture of gas and air to be formed, as hereinafter more fully described. A support B is contained within the casing to support the roof or dome $A^3$, and this support is preferably formed of wires arranged as indicated in Fig. 2 and having legs B′ extending through the bottom portion of the lining $A^2$ to rest on the bottom of the pan A′. Some of the wires forming the support B cross each other and are interlocked to form an exceedingly strong support for the roof. Within the casing A are arranged perforated pipes C, having their lower portions embedded in the lining $A^2$ and having their upper portions perforated for the passage of the air and gas, as hereinafter more fully described. The pipes C, as indicated in Fig. 2, are arranged in cross form, with the ends of the pipes extending through the side of the pan A′, and on the outer ends of the said pipes screw caps C′ to securely close the pipes and to hold the same in position in the casing A. One of the pipes is provided at the outer end with a sleeve $C^2$ instead of a cap, and in this sleeve screws a pipe D, connected with a gas-chamber E, having a valve F, connected by a hose G with a suitable gas-supply, the valve F serving to regulate the amount of gas passing into the gas-chamber E. Into the pipe D extends an air-pipe H, also passing through the chamber E, at one end thereof, to connect with a blower or other compressed-air device, so that compressed air passes through the pipe H into the pipe D to create a suction therein, and thereby draw the gas from the chamber E into the pipe D to mix with the air, the mixture finally passing into the pipe C and through the perforations thereof into the chamber E to insure a thorough mixing of the air and gas. The mixture thus formed within the chamber E passes through the holes $A^4$ to be ignited at the outside of the roof $A^3$. In the pipe H is arranged a valve I under the control of the operator for regulating the amount of compressed air passing through the pipe H into the pipe D. The burner-casing described is placed under the boiler or other device or article to be heated, it being understood that the mixture of air and gas issuing through the holes $A^4$ is ignited on the outside of the casing to produce the desired heat. By the use of the valves F and I the proper amount of air and gas is admitted to the burner for forming the most serviceable mixture of air and gas.

A burner-casing constructed in the manner described is very strong and durable and is not liable to burn out or become clogged up, as is so frequently the case with burners as heretofore constructed.

Having thus described my invention, I claim as new and desire to secure by Letters Patent—

1. The combination with a gas-burner, comprising a casing having outlets for the mixture of gas and air, and perforated pipes arranged within the said casing, of a gas-chamber connected with a valve-controlled gas-supply pipe, a pipe fitting into one end of the gas-chamber, and connected with the perforated pipes of the casing, and an air-pipe passing through the gas-chamber from the opposite end and extending into the pipe connected with said perforated pipes, the said air-pipe being provided with a valve near its point of entrance into the gas-chamber, as set forth.

2. In a gas-burner, a burner-casing comprising a pan, a lining of refractory material at the inside of the pan, a roof having perforations and also formed of refractory material, perforated pipes arranged within the casing, a gas-chamber connected with a gas-supply and communicating with the perforated pipes of the casing, an air-pipe also communicating with the perforated pipes, and valves for regulating the amount of gas and air, as set forth.

3. A gas-burner, having a burner-casing, comprising a pan, a lining at the inside of the pan, a roof integral with the said lining, and a support for the said roof, as set forth.

4. A gas-burner, having a burner-casing, comprising a metallic pan, a lining of refractory material on the inside of the said pan, a roof having perforations and formed of refractory material and integral with said lining, and a support for the said roof and formed of wires having legs resting on the said pan, as set forth.

5. A gas-burner, having a burner-casing comprising a metallic pan, a lining of refractory material on the inside of the pan, a roof having perforations and also formed of refractory material, perforated pipes arranged within the said casing, and a gas-inlet and an air-inlet for the said pipes, as set forth.

In testimony whereof I have signed my name to this specification in the presence of two witnesses.

GEORGE LUND.

Witnesses:
JAMES STUART YATES,
HARRY PATRICK MCDOWELL.